US 6,553,714 B2

(12) United States Patent
Vahrmeyer

(10) Patent No.: US 6,553,714 B2
(45) Date of Patent: Apr. 29, 2003

(54) CONTAINER FOR A BULB

(76) Inventor: Ronald Vahrmeyer, 3979 23rd Street, P.O. Box 813, Vineland, Ontario (CA), L0R 2C0

( * ) Notice: Subject to any disclaimer, the term of this patent is extended or adjusted under 35 U.S.C. 154(b) by 12 days.

(21) Appl. No.: 09/774,805

(22) Filed: Feb. 1, 2001

(65) Prior Publication Data
US 2002/0100210 A1 Aug. 1, 2002

(51) Int. Cl.⁷ .................................................. A01G 9/00
(52) U.S. Cl. ............................ 47/65.5; 47/84; 206/423
(58) Field of Search ............................ 47/84, 65.5, 73; 206/423

(56) References Cited

U.S. PATENT DOCUMENTS

| | | | |
|---|---|---|---|
| 198,159 A | * 12/1877 | Schermerhorn | |
| 436,183 A | * 9/1890 | Moore et al. | |
| 786,547 A | * 4/1905 | Chamberlin | 47/84 |
| 1,493,152 A | 5/1924 | Gardner | |
| 1,534,508 A | 4/1925 | Earp-Thomas | |
| 1,959,510 A | * 5/1934 | van Waveren | |
| 2,834,153 A | 5/1958 | Fearn | |
| 3,678,620 A | * 7/1972 | Vogas | 47/84 |
| 3,712,252 A | 1/1973 | Huang | 47/73 |
| 3,869,966 A | * 3/1975 | Brandigi et al. | |
| 3,924,354 A | * 12/1975 | Gregoire | 47/84 |
| 3,991,516 A | 11/1976 | Cicero | |
| 4,014,506 A | 3/1977 | Hanson | |
| 4,019,279 A | * 4/1977 | Moorman et al. | 47/73 |
| 4,057,932 A | 11/1977 | Spencer | |
| 4,435,918 A | 3/1984 | Shain | |
| D278,521 S | 4/1985 | Baird et al. | |
| 5,179,800 A | * 1/1993 | Huang | 47/73 |
| 5,298,041 A | * 3/1994 | Huang | 47/73 X |
| 5,379,499 A | * 1/1995 | Jacksin | 27/1 |
| 5,852,896 A | 12/1998 | Flash, Jr. | |
| 6,061,955 A | * 5/2000 | Domstein | 47/84 X |
| 6,161,331 A | * 12/2000 | Lalane | 47/73 |
| 6,427,379 B1 | * 8/2002 | Lehner | 47/66.1 |
| 2002/0100210 A1 | * 8/2002 | Vahrmeyer | 47/65.5 |

FOREIGN PATENT DOCUMENTS

| | | | |
|---|---|---|---|
| EP | 0049122 A1 | * | 4/1982 |
| JP | 4-18280 | * | 1/1992 |
| JP | 7-69337 | * | 3/1995 |
| JP | 11-342940 | * | 12/1999 |
| JP | 3001-171640 | * | 6/2001 |

* cited by examiner

Primary Examiner—Peter M. Poon
Assistant Examiner—Jeffrey L. Gellner
(74) Attorney, Agent, or Firm—Eugene J.A. Gierczak

(57) ABSTRACT

A plant container containing side walls extending from a bottom to a top opening so as to define a cavity, the top opening smaller than the bottom; means for introducing seeds of the plant into the cavity from the bottom.

10 Claims, 7 Drawing Sheets

CONTAINER FOR A BULB

FIELD OF INVENTION

This invention relates generally to containers for plants or shrubs and particularly relates to a container for a bulb and a method of planting a bulb in a container.

BACKGROUND ART

The most popular and common container for potted plants and shrubs is of the type where the top cross-section or volume of earth or nutrient is greater than the bottom. Such tapered pots may comprise of plastic or clay material in a fashion well known to those persons skilled in the art.

Such prior art pots are generally planted by first introducing soil in the bottom section of the tapered plant and then introducing seed or bulbs on top of such soil and thereafter topping up the pot with further soil or nutrient.

Such prior art tapered pots are not generally efficient in terms of providing sufficient volumetric space for the roots of the plant which tend to concentrate at the bottom section of the pot which tapers to provide less and less crosssectional area towards the bottom of the tapered prior art pots.

Furthermore such prior art pots are generally non-decorative or appealing to look at since they comprise generally of the same shape.

Various attempts have heretofore been made to improve on such prior art tapered pots.

For example U.S. Pat. No. 3,991,516 discloses a segmented container for potted plants and shrubs of the type defining an inverted conical shape or spherical zone segment which provides greater volume of earth at the base of the container than at the top to incur greater and healthier root growth. The container assembly consists of a base and two or more separable upper section shell segments which are separable along a vertical line and having circumferential sealing means.

Moreover U.S. Pat. No. D278,521 relates to an ornamental design for a two part flower container while U.S. Pat. No. 2,834,153 relates to a venting cone for use in the lower part of a flower pot adapted to be positioned over the opening in the bottom thereof comprising an annular rim having spacing nodes extending from the undersurface, a wall having an intermediate portion of interlay strips extending upwardly from the upper edge of the rim, and inperforate cone extending from the upper edge of the wall to the apex of the device.

Moreover U.S. Pat. No. 1,534,508 relates to a device for testing soil or seed comprising a closed frusto-conical container having its end walls formed by removable discs adapted to fit the container body snugly, one of said discs being apertured to permit insertion of seed when the container is charged with soil.

Yet another arrangement is shown in U.S. Pat. No. 4,057,932 which teaches a container split in half longitudinally. The two half sections may be separate, in which case they are held together by the walls of a crate into which a number of the containers are placed. Alternatively the sections may be connected together along their bottom margins by a hinge.

Yet another arrangement is shown in U.S. Pat. No. 4,435,918 which shows a flower pot comprising an upper pot, lower pot, with means that can regulate the water supply to the soil and a means that can adjust the exposed area of the soil to the water, thereby minimizing the unfavourable effect of the drastic changes of the weather.

Yet another arrangement is illustrated in U.S. Pat. No. 5,852,896 which relates to a container and methodology for growing a plant in soil, soil within an area defined by an annular inner wall having an open top end to expose the soil and plant to ambient air; the inner wall includes transverse holes around its circumference and up its length. In one embodiment the inner wall includes a water impervious circumferal band at its upper end to help maintain the soil top surface dry. An outer annular wall of water impervious material laterally surrounds, in spaced relationship, the inner wall to define an open space with upper opening between the walls into which water can be applied and air may flow.

Finally U.S. Pat. No. 4,014,506 relates to a support collar assembly which is designed, primarily to fell a need for a simple, reliable and economical way of suspending and supporting standard flower pots, and the like within any one of a series of larger diametered containers, or within deeper containers.

These and other prior art devices present relatively complicated structures which are not well suited for easily and simply planting seeds, shrubs, bulbs or the like.

It is an object of this invention to provide an improved container, which may be easily used, for planting bulbs of the like.

DISCLOSURE OF INVENTION

It is an aspect of this invention to provide a plant container containing side walls extending from a bottom to a top opening so as to define a cavity, said top opening smaller than said bottom; means for introducing seeds of said plant into said cavity from said bottom.

It is a further aspect of this invention to provide a container for a bulb comprising sidewalls extending generally upwardly and inwardly from a bottom to top opening so as to define a cavity; said bottom including an opening for introducing said bulb into said cavity; removable means for closing said opening.

It is another aspect of this invention to provide a method of planting a bulb in a container having sidewalls extending generally inwardly from a bottom to a top opening so as to define a cavity, said bottom having an opening, comprising the steps of disposing said container upside down with said top opening pointing downward; introducing said bulb into said cavity through said bottom opening where said top opening is smaller than said bulb; filling said cavity with soil; closing said bottom opening; disposing said container right side up.

It is yet another aspect of this invention to provide a method of planting a bulb in a container having upper and lower mating and separable sidewall sections, said mated sidewall sections extending generally inwardly from a bottom surface to a top opening so as to define a cavity, said method comprising the steps of separating said upper sidewall section from said lower sidewall section; placing soil and a bulb into said lower sidewall section; placing said upper sidewall section into registrable mating disposition with said lower sidewall section.

BEST MODE FOR CARRYING OUT THE INVENTION

Figures 1, 2:
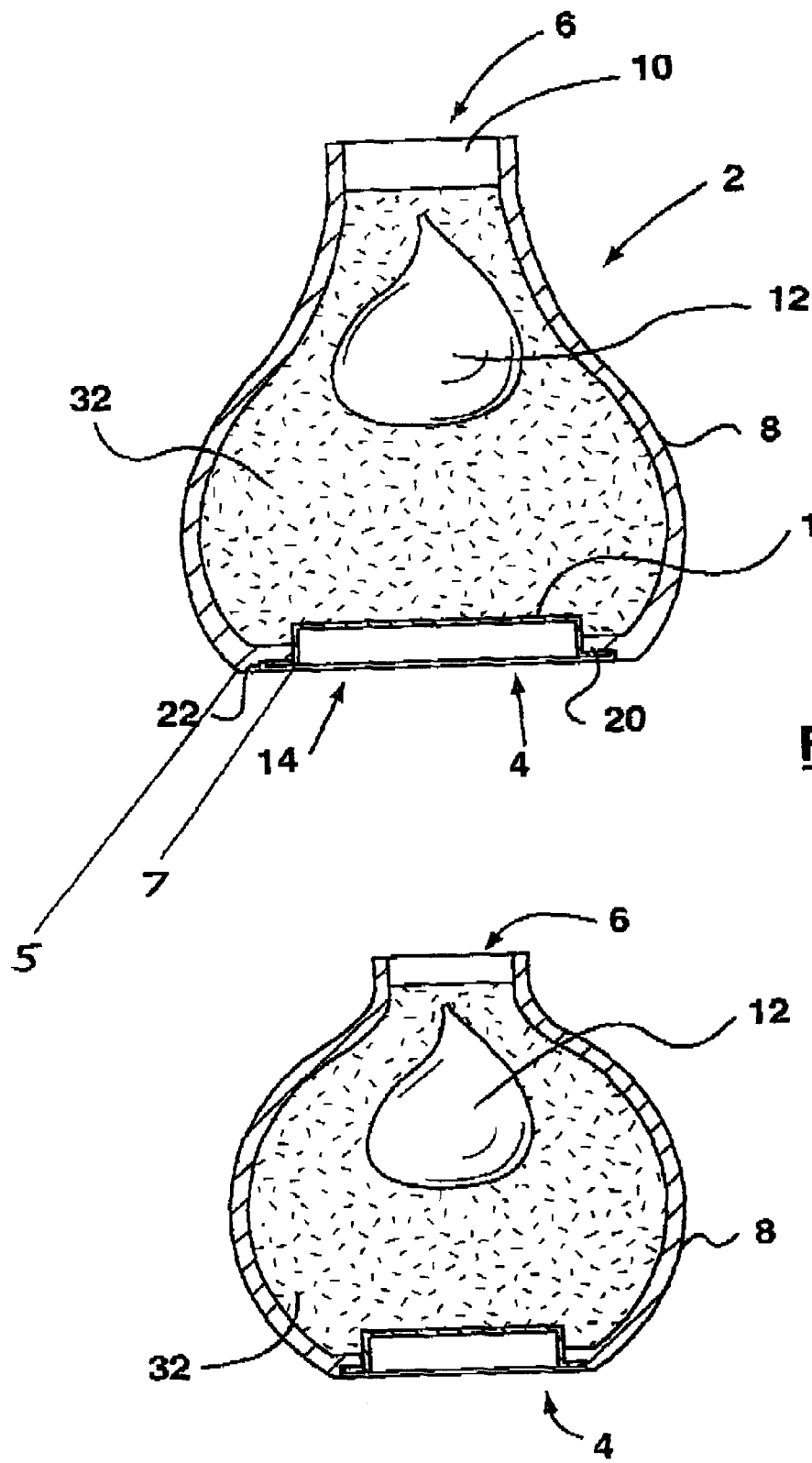
FIG. 1 is a side cross-sectional view of one embodiment of the invention.
FIG. 2 is a side cross-sectional view of the second embodiment of the invention.

In the description that follows, like parts are marked throughout the specification and the drawings with the same respective reference numerals. The drawings are not necessarily to scale and in some instances proportions may have been exaggerated in order to more clearly depict certain features of the invention.

FIG. 1 generally illustrates one embodiment of the invention, which illustrates the container 2 having a bottom 4 and a top 6. Sidewalls 8 extend generally upwardly and inwardly from the bottom 4 towards the top 6. The top 6 presents an opening 10, which is generally smaller in size than the bottom 4. Furthermore the top opening 10 is generally smaller in size than the bulb 12, but does not need to be. The plant 12 may comprise of any seeds, shrubs, bulbs or the like. In the embodiment illustrated a bulb has been shown although the invention should not be limited thereto.

The sidewalls 8 extend generally inwardly from the bottom 4 to the top opening 10 so as to resemble the side profile of a bulb.

The bottom 4 in FIG. 1 presents a bottom opening 14 which has an outer edge 5 and an inner edge 7. The bottom opening 14 may be closed by the plug 16 as shown In FIG. 1 which is adapted to be inserted in the hole 14 or by a bottom surface 18 shown in FIG. 3 which Is adapted to embrace the lower portions of the sidewall 8.

Figure 4:
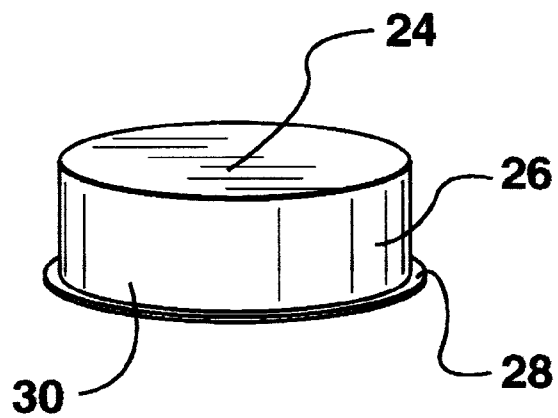
FIG. 4 is a perspective view of a plug.

The hole 14 shown in FIG. 1 provides access into the cavity defined by the sidewalls 8 and may include the shoulder 20 and undercut 22. The plug 16 is more fully shown in FIG. 4 and includes a solid end wall 24, solid circumferential walls 26 extending from the wall 24. The solid circumferential wall 26 includes a radial flange section 28 which is adapted to be received by the undercut 22 as shown in FIG. 1. The inner portion 30 of the plug may be hollow.

The embodiment shown in FIG. 2 is similar to the embodiment shown in FIG. 1 apart from the side profile of the sidewalls 8 where the sidewalls 8 in FIG. 2 extend generally inwardly from the bottom 4 to the top opening 6.

The configuration shown in FIG. 2 resembles more of a sphere while that in FIG. 1 resembles a bulb.

FIG. 1 includes means for introducing seeds, bulbs or the like into the cavity 32 from the bottom 4. In particular such means comprises the opening 14 at bottom 4 and the removable plug 16 for closing said opening.

Figure 3:
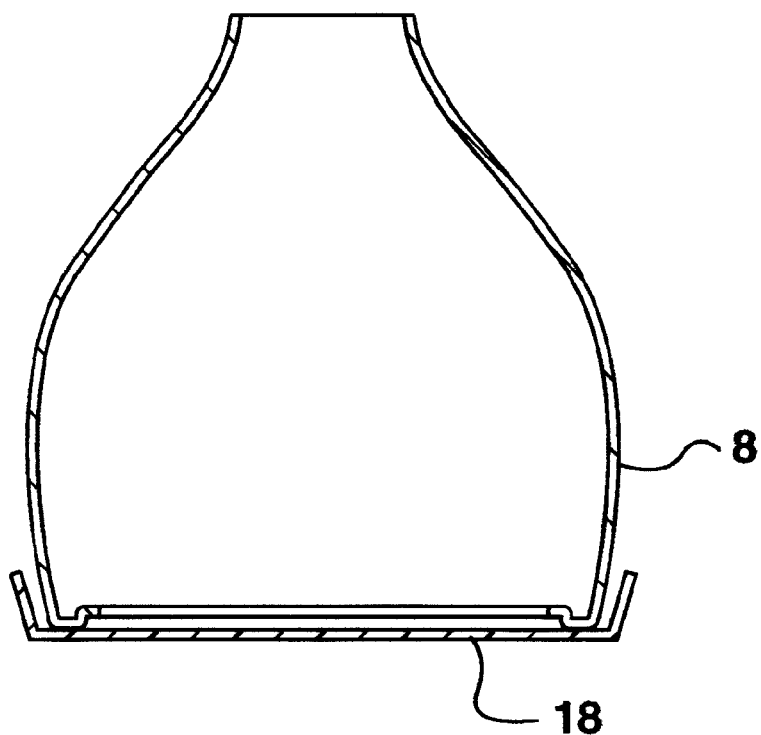
FIG. 3 is a side cross-sectional view of the third embodiment of the invention.

Accordingly FIG. 1 illustrates a method of planting a bulb 12 into a container 2 having sidewalls 8 extending generally inwardly from a bottom 4, a top opening 10 so as to define a cavity 32. Such method includes the steps of disposing the container 2 upside down with the top opening 10 pointing downwardly. Then the bulb 12 is introduced into the cavity 32 through the bottom opening 14 where the top opening 10 is smaller than the bulb so as to prevent the bulb from dropping through the opening. Alternatively, some plant mesh material may be first introduced into the cavity 32 so as to plug the opening 10. Thereafter the bulb 12 may be introduced into the cavity 32 through the opening 14. Thereafter the cavity can be filled with soil and the bottom opening closed. The bottom opening may be closed with the plug 16 as shown in FIG. 1 or the bottom surface 18 as shown in FIG. 3. Thereafter the container 2 is disposed right side up.

The container shown in FIG. 2 may also be used similarly to that shown in FIG. 1 so as to introduce the bulb 12 into cavity 32 as shown in FIG. 2.

The container 2 may be comprised of a variety of materials including clay or plastic. Furthermore the plug 16 or bottom surface 18 may comprise of a variety of materials including plastic or the like.

Figure 5:
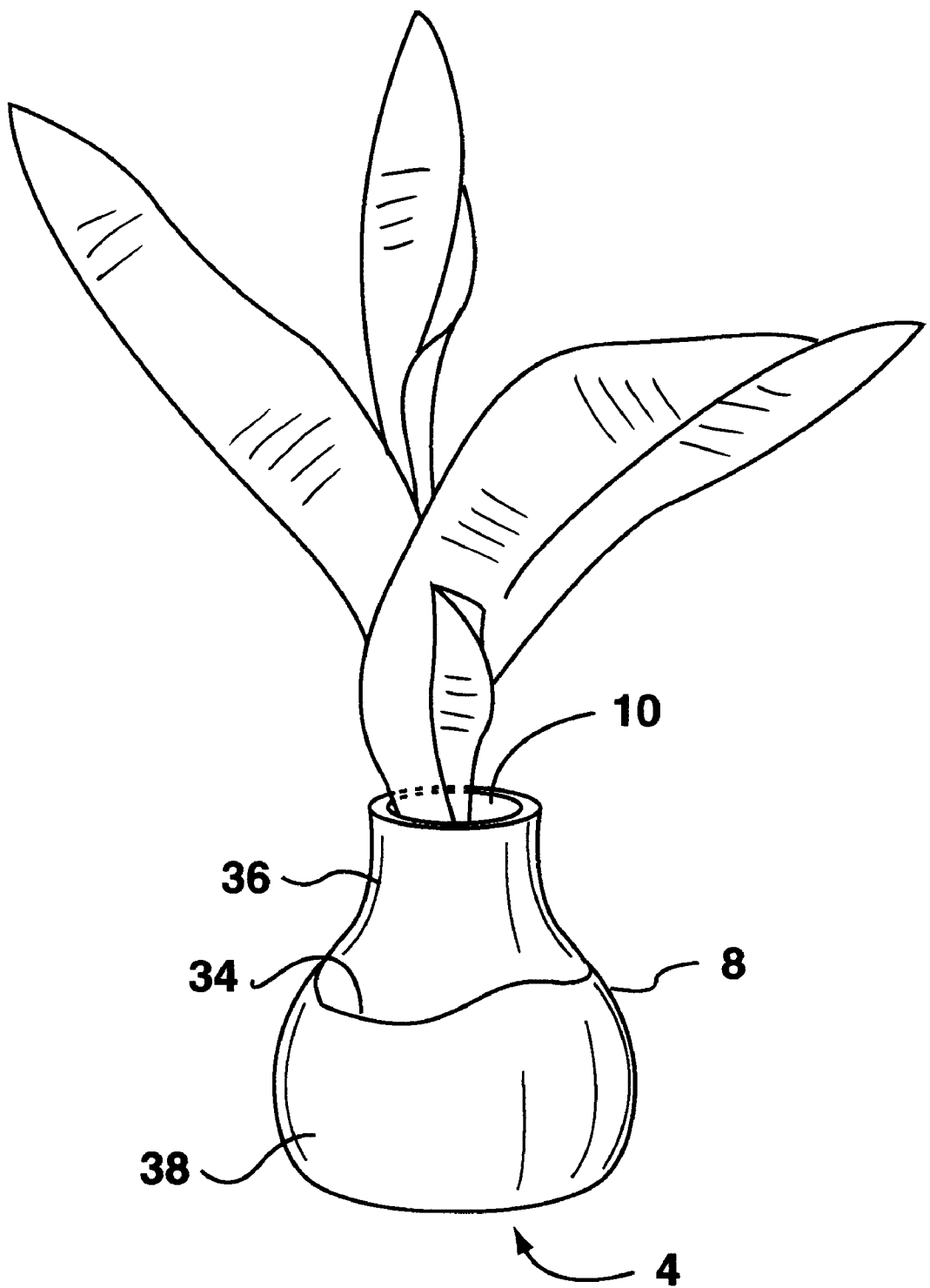
FIG. 5 is a side perspective view of another embodiment of the invention.
Figure 6:
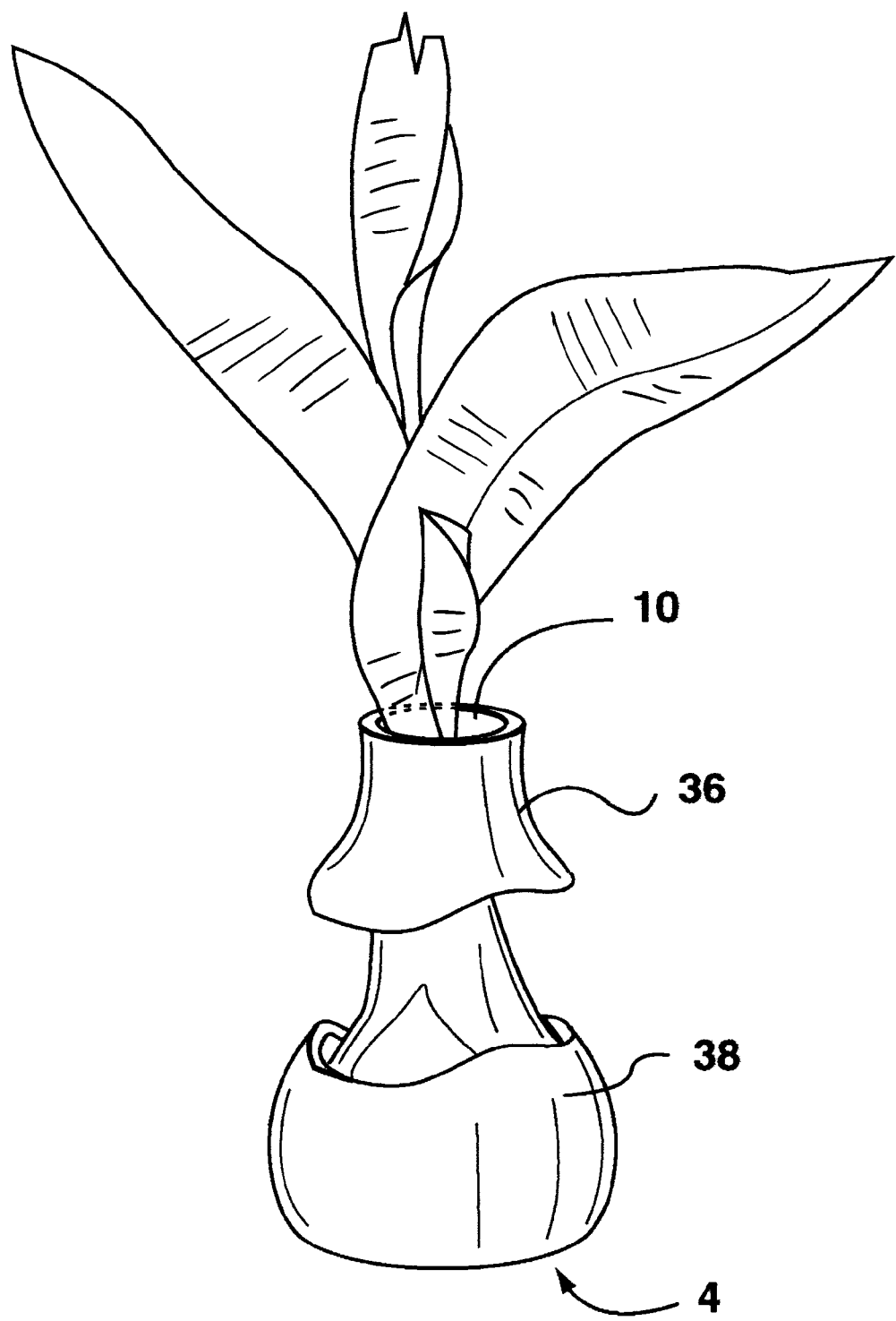
FIG. 6 is a perspective view of FIG. 5 with the upper and lower sidewall sections separated from one another.
Figure 7:
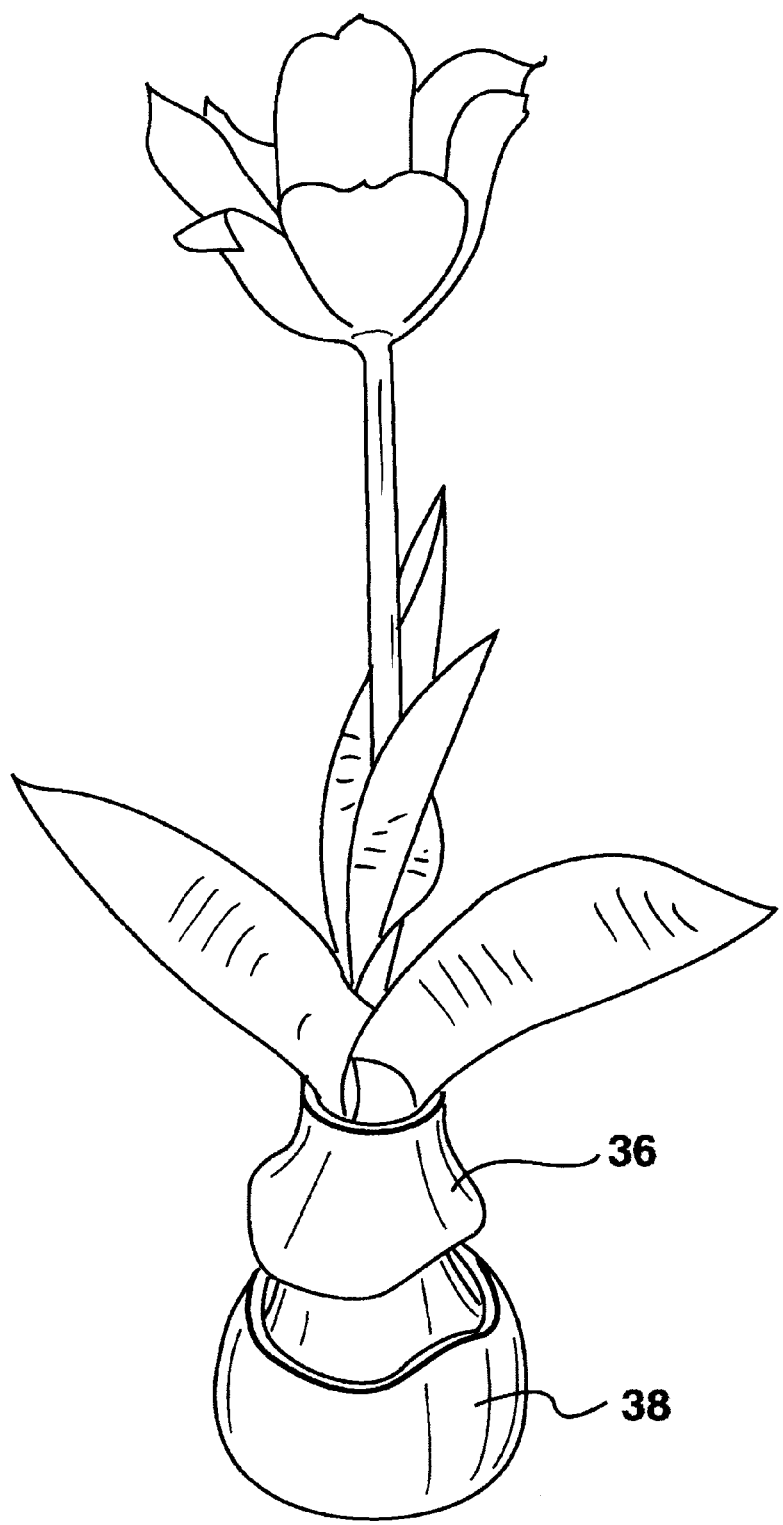
FIG. 7 is a another perspective view of FIG. 6.

FIGS. 5 and 6 illustrate another embodiment of the invention whereby the means for introducing seed or bulb into container 2 comprises a split 34 in the sidewalls 8.

More particularly the embodiment shown in FIGS. 5 and 6 illustrates an upper sidewall section 36 and a lower sidewall section 38. The upper sidewall section presents the top opening 10 while the lower sidewall section 38 presents a bottom 4. In the embodiment shown in FIG. 5 the bottom 4 will generally consist of a solid bottom surface which is integral with a lower sidewall section 38. Alternatively the bottom 4 could include the configuration as shown in FIGS. 1, 2 and 3.

The upper sidewall section 36 is separable from the lower sidewall section 38 as shown in FIG. 6 so as to permit introducing of the bulb or the like into the cavity 32. Furthermore the upper sidewall section is registrable in mating fashion with the lower sidewall section 38 as shown in FIG. 5 so as to contain the bulb 12 in the cavity 32.

Figure 8:
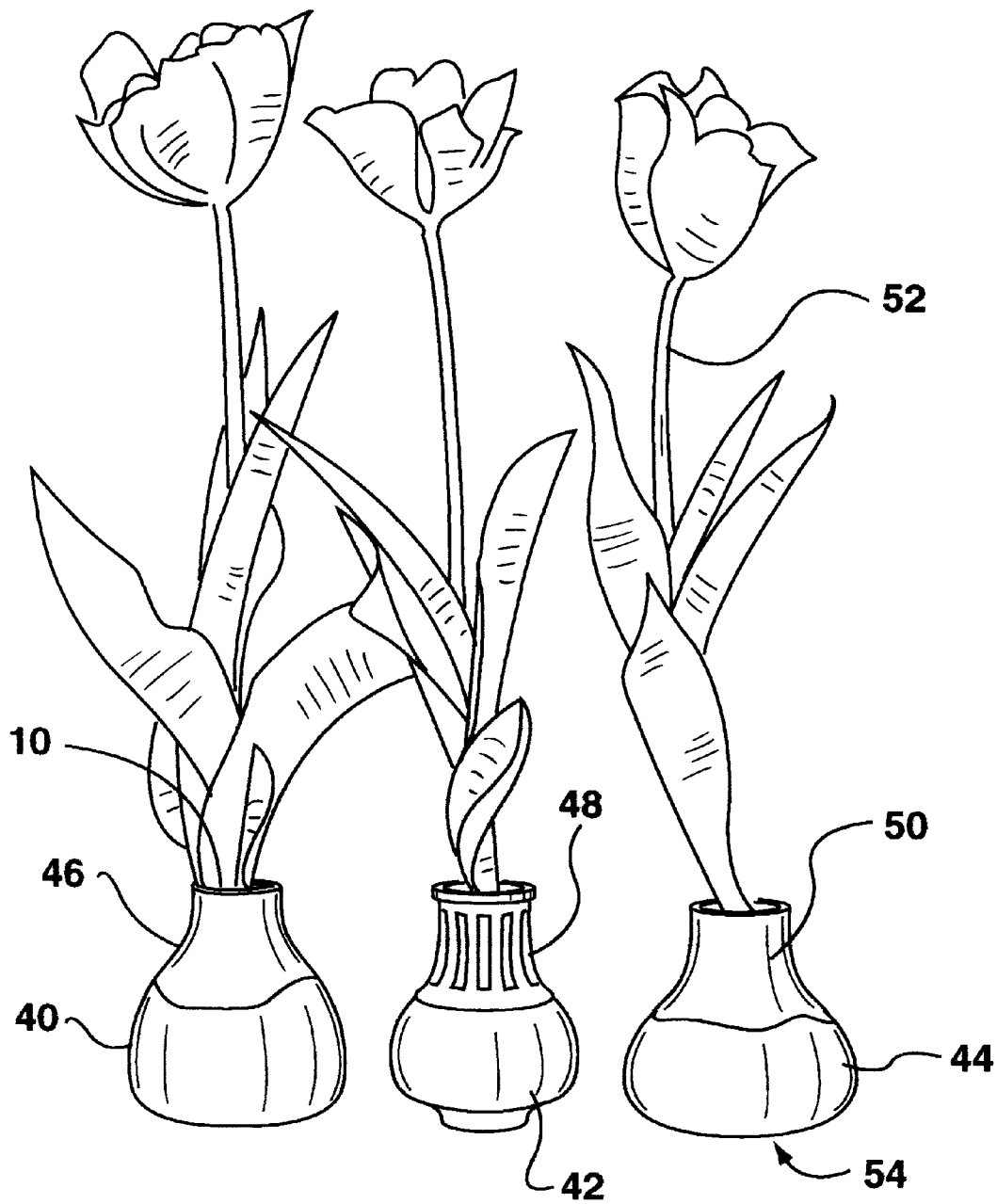
FIG. 8 is a side elevational view of three other embodiments of the invention.

FIG. 8 shows other embodiments of the invention whereby the container 2 includes upper sidewall section 36 and lower sidewall section 38 which is split along the line 34. The split 34 may be substantially linear as shown by the middle container 2 as shown in FIG. 8 or may be non-linear as shown by the left and right containers as shown in FIG. 8.

Furthermore the container 2 may include a variety of shapes 40, 42 and 44 of the lower sidewall section as well as a variety of upper sidewall sections 46, 48 and 50 as shown in FIG. 8, so as to provide a variety of pleasing decorative shapes which are aesthetic to the eye.

Moreover the stem 52 of the bulb grows through the top opening 10 and may include at least one bulb.

The embodiments shown in FIGS. 5, 6, 7 and 8 will generally include a solid bottom surface 4 although the bottom surface may include drain holes 54 as required.

The containers 2 as shown in the embodiments herein are well suited for bulbous plants such as tulips, amaryllis or the like.

Moreover introducing water from the top opening 10 may water such plants.

Figure 9:
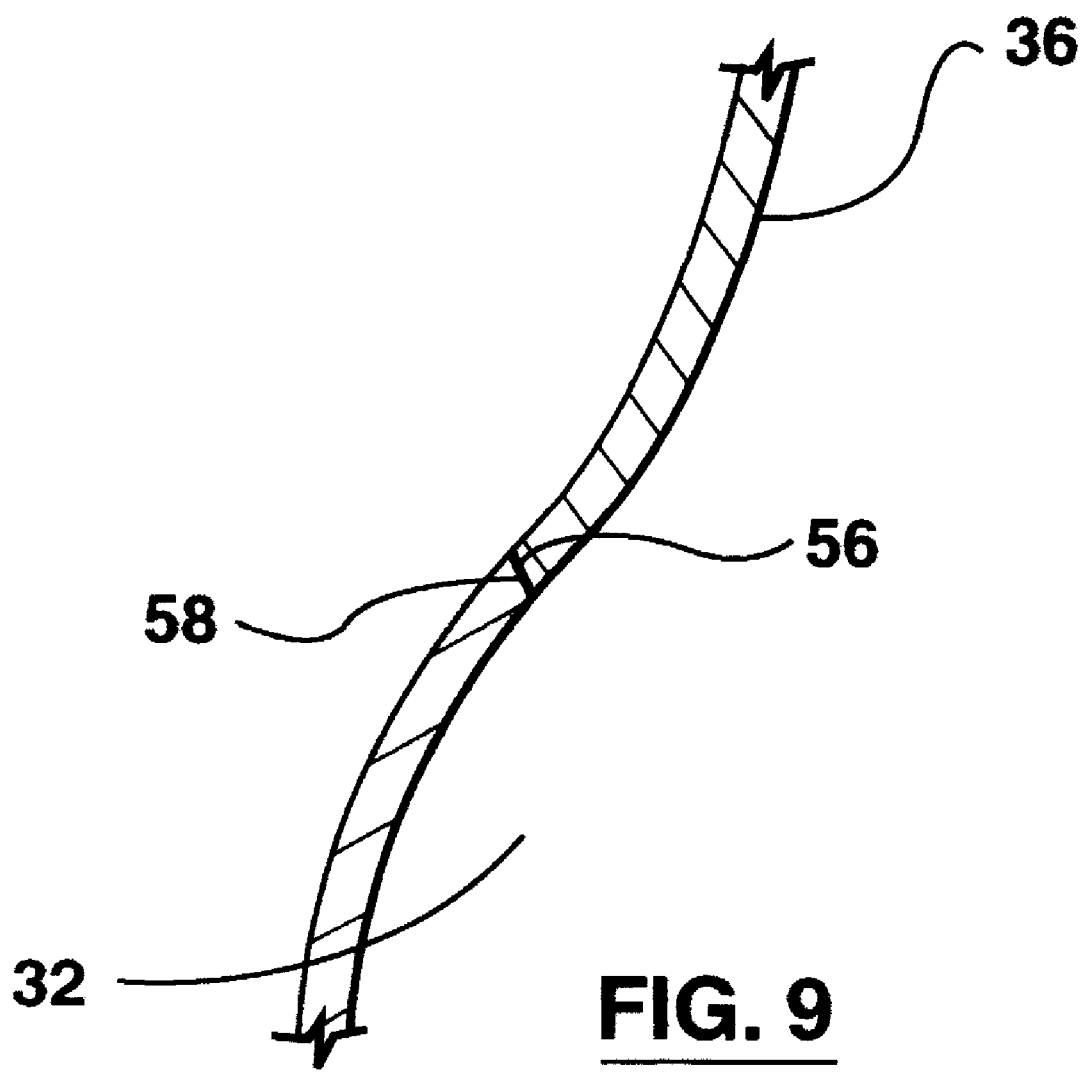
FIG. 9 is a partial cross-sectional view of the mating surfaces between the upper and lower sidewall sections.

Furthermore the mating edge 56 of upper sidewall section 36 and the mating edge 58 of lower sidewall section 38 may be orientated as shown in FIG. 9 so as to minimize the possibility of any water introduced into the container 2 from spilling out and over the outer surface of the container 2. In particular the mating edges 56 and 58 may be disposed so as to deflect any moisture back into the cavity 32. Furthermore the mating edges 56 and 58 may be orientated as shown in FIG. 9 so as to assist the registration of the mating edges of the upper sidewall section with the lower sidewall section 38.

The embodiments shown in the drawings illustrate a bottom having an opening for introducing the bulb into the cavity and removable means for closing said opening. In the embodiment shown in FIGS. 1 and 2 such removable means comprises a plug 16 for closing the opening 14 in the bottom 4.

FIG. 3 illustrates the removable means as comprising a bottom wall 18 adapted to embrace the side of the sidewall 8. In particular the bottom wall 18 closes the opening 14.

The removable means in FIGS. 5, 6, 7, 8 and 9 comprises:

(a) the upper sidewall section 36 which presents the top opening 10;

(b) the lower sidewall section 38 presenting the bottom 4 said upper and lower sidewall sections;

(c) separable from one another so as to permit introduction of said bulb into the cavity 32;

(d) registrable with one another in mating fashion so as to contain the bulb 12 in cavity 32.

FIGS. 5–9 illustrate a method of planting a bulb or the like in a container 2 having upper and lower mating and separable sidewalls sections 36 and 38, where said sidewall sections extend generally inwardly from a bottom surface 4 to a top opening 10 so as to define a cavity 32, such method comprising the steps of:

(a) separating the upper sidewall section 36 from the lower sidewall section 38;

(b) placing soil and a bulb 12 into the lower sidewall section 38;

(c) placing said upper sidewall section 36 into registrable mating disposition with the lower sidewall section 38.

The stem 52 of the bulb 12 grows through the top opening 10 as illustrated by the drawings.

The container 2 as shown herein provides an aesthetically pleasing shape. Furthermore the method of planting a bulb or the like with the container 2 shown herein may be quickly and easily performed and well adapted for automated means.

Various embodiments of the invention have now been described in detail. Since changes in and/or additions to the above-described best mode may be made without departing from the nature, spirit or scope of the invention, the invention is not to be limited to said details.

What is claimed is:

1. The combination of:

(a) a plant container containing side walls extending from a bottom to a top opening so as to define a cavity, said top opening being smaller than said bottom; said bottom having an outer edge and an inner edge; said inner edge defining a bottom opening; a removable plug adapted for insertion into said bottom opening to engage the inner edge of the bottom opening so as to close said bottom opening; and (b) a bulb disposed within said container.

2. A plant container as claimed in claim 1 wherein (a) said bottom includes an undercut;

(b) said inner edge includes a shoulder; and (c) said plug includes a solid end wall and a solid circumferential wall extending from the solid end wall including a radial flange section which is adapted to be received by said undercut.

3. A plant container as claimed in claim 2 wherein said container comprises clay and said plug comprises plastic.

4. The combination as claimed in claim 1 having a plant disposed within said container.

5. The combination of:

(1) A container for a bulb comprising:

(a) sidewalls extending generally upwardly and inwardly from a bottom to top opening so as to define a cavity;

(b) said bottom including an opening for introducing said bulb into said cavity;

(c) said bottom comprising a bottom outer edge and a bottom inner edge, both being substantially circular;

(d) the radius of said bottom inner edge being smaller than the radius of said bottom outer edge;

(e) said opening is defined by said bottom inner edge;

(f) said bottom includes. an undercut;

(g) said inner edge includes a shoulder;

(h) a removable plug for closing said bottom opening;

(i) said plug is adapted to engage the inner edge of the bottom opening so as to be inserted into said bottom opening to close it;

(j) said plug has a radial flange which is adapted to be received by said undercut of said inner edge; and (2) a bulb disposed within said container.

6. A container as claimed in claim 5 wherein said sidewalls extend generally upwardly and inwardly so as to resemble a bulbous shape.

7. A container as claimed in claim 5 wherein said container comprises clay and said plug comprises plastic.

8. A method of planting a bulb in a container having sidewalls extending generally inwardly from a bottom to a top opening so as to define a cavity, said bottom having an opening, comprising the steps of:

(a) disposing said container upside down with said top opening pointing downward;

(b) introducing said bulb into said cavity through said bottom opening where said top opening is smaller than said bulb;

(c) filling said cavity with soil;

(d) closing said bottom opening;

(e) disposing said container right side up.

9. A method as claimed in claim 8 wherein said closing comprises plugging said bottom opening with a plastic plug.

10. A method as claimed in claim 8 wherein said closing comprises placing a plastic bottom surface against said bottom opening, said bottom surface adapted to embrace said sidewalls.

* * * * *